United States Patent
Zaki

(10) Patent No.: US 6,449,600 B1
(45) Date of Patent: Sep. 10, 2002

(54) SYSTEM, METHOD AND COMPUTER PROGRAM PRODUCT FOR AIRPORT EQUIPMENT INFORMATION AND EXCHANGE

(75) Inventor: Hossam A. Zaki, Grapevine, TX (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/413,932

(22) Filed: Oct. 7, 1999

(51) Int. Cl.[7] .............................................. G06F 17/60
(52) U.S. Cl. .......................................... 705/29; 705/37
(58) Field of Search .............................. 705/29, 30, 37, 705/28

(56) References Cited

U.S. PATENT DOCUMENTS

| | | | | |
|---|---|---|---|---|
| 5,077,665 A | * | 12/1991 | Silverman et al. | 705/37 |
| 5,715,402 A | * | 2/1998 | Popolo | 705/37 |
| 6,131,087 A | * | 10/2000 | Luke et al. | 705/26 |
| 6,189,003 B1 | * | 2/2001 | Leal | 707/2 |

FOREIGN PATENT DOCUMENTS

DE           3400123 A   *   1/1985

OTHER PUBLICATIONS

Hoffman, Thomas, "Broker Keeps Containers From Shipping Empty" Computerworld v32n37, pp. 29–30, Sep. 14, 1998.*
Cottrill, Ken, "Boxes on the Web"; Traffic World, p. 20, Jan. 12, 1998.*
"Transamerica Leasing's Newest Online Initiatve Increases Customer Service Through Technology Increments"; PR Newswire p917NYW151, Sep. 17, 1997.*
Bonney, Joseph, "Transamerica Launches Greybox", American Shipper, v37, n9, p. 72, Sep. 1995.*

* cited by examiner

Primary Examiner—Robert P. Olszewski
Assistant Examiner—Andrew J. Fischer
(74) Attorney, Agent, or Firm—Woodcock Washburn; Lise A. Rode; Mark T. Starr

(57) ABSTRACT

Equipment shortage and surplus conditions among a plurality of carriers at an airport are reduced by a system and method that receives a report of selected equipment shortages and surpluses from each carrier, matches reported equipment shortages from the different carriers with reported equipment surpluses from other carriers, and proposes exchanges of equipment between the carriers where matches are found.

12 Claims, 2 Drawing Sheets

SYSTEM, METHOD AND COMPUTER PROGRAM PRODUCT FOR AIRPORT EQUIPMENT INFORMATION AND EXCHANGE

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention is directed to data processing systems and methods, and more particularly, to a system, method, and computer program product for reducing airport equipment shortage and surplus conditions at an airport by facilitating the exchange of airport equipment among different carriers based on reported equipment shortages and surpluses of each carrier.

BACKGROUND

At any given airport, air carriers, including both passenger airlines and freight carriers, and also independent ground handlers, are often faced with shortages of some equipment and surpluses of other equipment, such as containers, vehicles, etc. These equipment shortages and surpluses hinder efficient operation and adversely affect operational costs.

A carrier faced with a shortage of certain equipment typically has only three choices to avoid a service failure: (1) buy more equipment, (2) lease equipment to cover the shortage, or (3) reposition equipment from other airports, if possible. Many carriers opt to reposition to avoid additional equipment purchases or leases, but repositioning is not always the most cost effective solution. Indeed, in many cases, it might have been possible to lease the needed equipment at a much lower cost and in a more timely manner. The problem is that carriers faced with equipment shortages often do not have timely information regarding equipment available for lease.

Surpluses of equipment are also undesirable. A carrier must pay for equipment whether that equipment is being used or not. When equipment sits idle, the carrier is not operating at optimum efficiency.

Shortage and surplus conditions are not easily solved. Equipment requirements of a given carrier can change daily, and therefore, repositioning equipment to address a shortage one day may result in a surplus the next day. Accordingly, there is a need for a system and method for reducing carrier equipment shortage and surplus conditions at an airport to enable carriers to operate more efficiently and cost-effectively. The present invention satisfies this need.

SUMMARY OF THE INVENTION

Equipment shortage and surplus conditions among a plurality of carriers at an airport are reduced by a system, method, and computer program product that receives a report of selected equipment shortages and surpluses from each carrier, matches reported equipment shortages from the different carriers with reported equipment surpluses from other carriers, and proposes exchanges of equipment between the carriers where matches are found.

The system of the present invention comprises a user interface accessible by each carrier via a respective client device, a database for storing the reports received from each carrier, and a matching engine that matches reported equipment shortages with reported surpluses. Each carrier uses its client device to report its shortages and surpluses of selected equipment for a next planning horizon. After collecting the reports from each carrier, the matching engine matches shortages with surpluses and then recommends exchanges of equipment between carriers to remedy equipment imbalances in the most efficient way. In a preferred embodiment, the matching process comprises a three phase approach. Preferably, the exchanges of equipment between carriers will take the form of short-term equipment leases, and the system will also provide lease management services to track the leased equipment and to manage associated financial aspects, such as billing. The system also preferably comprises a real-time processor to perform up-to-the-minute searches for alternate equipment with real-time reporting capabilities.

The system, method, and computer program product of the present invention can be used to provide an equipment information and exchange service to the various carriers at an airport. The service could be provided by a third party, but preferably, the service is provided to the carriers by the airport authority. Preferably, the carriers that desire to use the service will pay the airport authority for this service. Service fees may consist of several components. For example, the first part may be a fixed fee to join the service, i.e., an initiation or sign-up fee. The second component may be a monthly service fee to use the service, and the third component may be a per transaction fee that is applicable when a recommended exchange takes place between two carriers. The airport authority may require the carriers to participate in this service as part of their contracts for use of the airport.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
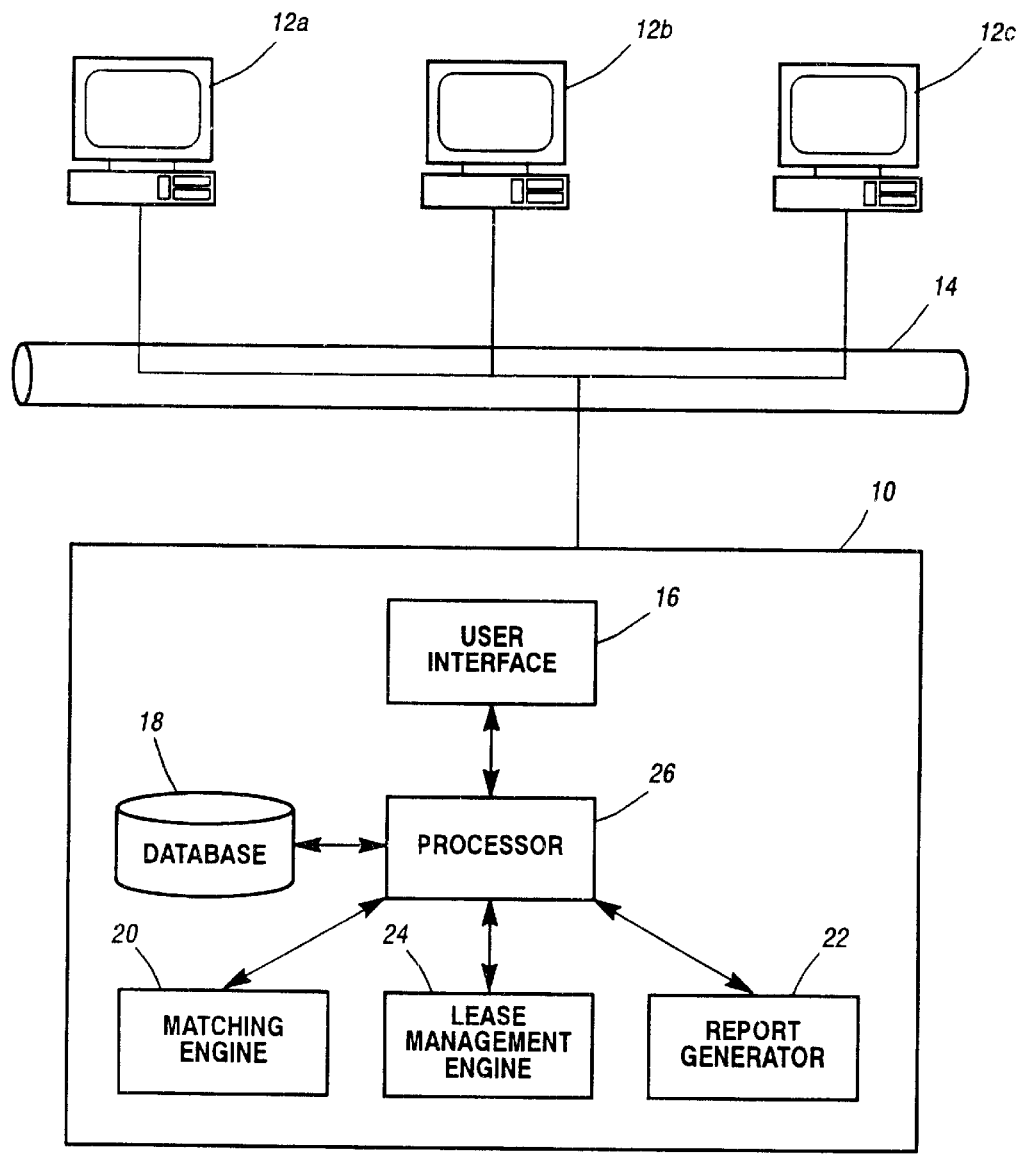
FIG. 1 is a block diagram of a preferred embodiment of a system of the present invention.

Referring to the drawings, wherein like numerals represent like elements throughout, FIG. 1 is a block diagram of a system for reducing equipment shortage and surplus conditions among a plurality of carriers at an airport, in accordance with a preferred embodiment of the present invention. As used herein, the term "carrier" includes air carriers (e.g., passenger airlines, freight forwarders, other cargo carriers, etc.) as well as independent ground handlers that provide ground handling services to the air carriers. As shown in FIG. 1, in the presently preferred embodiment, the system has a client-server architecture. Each carrier has a client device, e.g., client devices 12a, 12b, 12c, etc., that communicates with a system server 10 via a network 14. Each client device 12a, 12b, 12c may comprise a personal computer, workstation, terminal, personal digital assistant (PDA) or other device capable of communicating over the network 14. The network may comprise a local area network (LAN), a wide area network (WAN), the Internet, an intranet, dedicated data lines, a cellular, wireless, microwave, satellite or other wireless network, or any other suitable type of communication network. Preferably, the server 10 resides at an airport authority administration building and is maintained by a system administrator employed by the airport authority.

According to the present invention, each carrier uses its client device (e.g., 12a, 12b, or 12c) to report to the server 10, on a periodic basis, its shortages and surpluses of selected equipment for the next planning horizon. As used herein, the term "planning horizon" means a pre-determined future time period for which the carriers report their expected equipment shortages and surpluses. For example, the planning horizon may comprise a selected number of hours, days, weeks, or months. In the presently preferred embodiment, the carriers report their equipment shortages and surpluses, on a daily basis, for the next twenty-four hours (i.e., the planning horizon is the next 24 hour period).

After collecting the reports from each carrier, the server 10 will match shortages with surpluses among the various air carriers. The server 10 will then recommend exchanges of equipment between carriers to remedy equipment imbalances in the most efficient way, and will report the recommended exchanges to the interested carriers. Preferably, the exchanges of equipment between carriers will take the form of short-term equipment leases, and the server 10 will also provide lease management services to track the leased equipment and its associated financial aspects, such as billing. The server 10 also preferably will be equipped with a real-time processor to perform up-to-the-minute searches for alternate equipment with real-time reporting capabilities.

Preferably, the system of the present invention is used to provide an equipment information and exchange service to the different carriers at an airport. The service could be provided by a third party, but preferably, the service is provided to the carriers by the airport authority. Preferably, the carriers that desire to use the service will pay the airport authority for this service. Service fees may consist of several components. For example, the first part may be a fixed fee to join the service, i.e., an initiation or sign-up fee. The second component may be a monthly service fee to use the service, and the third component may be a per transaction fee that is applicable when a recommended exchange takes place between two carriers. The airport authority may require the carriers to participate in this service as part of their contracts for use of the airport. Preferably, the revenue from this service will at least cover the costs of running the service and may provide a profitable operation for the airport authority.

Still referring to FIG. 1, in the presently preferred embodiment, the server 10 comprises a user interface 16 accessible by the respective client devices 12a, 12b, 12c of each carrier via the network 14, a database 18 for storing reported shortages and surpluses received from each carrier, a matching engine 20 for matching a reported equipment shortage from one carrier with a reported equipment surplus of another carrier and for reporting proposed equipment exchanges to the interested carriers, a lease management engine 24 to support lease management services, and a report generator 22 for developing canned and customized reports to capture information on leased equipment. The server 10 may comprise a conventional personal computer or computer workstation with sufficient memory and processing capability to handle the processing functionality of the various system components. Alternatively, the server 10 can be implemented in a distributed architecture comprising a plurality of personal computers or computer workstations, wherein different functional components of the system operate on different computers in a distributed manner.

The user interface 16 provides a means for carriers to report their equipment shortages and surpluses for each planning horizon to the server 10, and a means for the server 10 to report back to the carriers recommended exchanges of equipment to remedy the equipment imbalances. The user interface 16 can also be used by the server administrator (e.g., the airport authority) to input and manipulate the database 18, to view input and output data, and to override output results. Preferably, the user interface 16 employs Web-based technologies (e.g. Hyper-Text Markup Language (HTML), Common Gateway Interface (CGI) scripting, Java, or the like) to enable the client devices 12a, 12b, 12c to interact with the server 10 using commercially available Web browsers, such as Microsoft Internet Explorer, Netscape Navigator, or the like. Alternatively, the user interface 16 may operate in conjunction with a special purpose client program (not shown) that runs on each client device 12a, 12b, 12c to provide the necessary client/server interaction. In still other embodiments, carriers can report their shortages and surpluses via electronic mail, voice mail, facsimile, or postal mail, in which case manual entry of the information at the server 10 may be required.

In the present embodiment, the user interface 16 presents a form-based entry mechanism to enable each carrier to report the following information for a given type of equipment for the next planning horizon:

Carrier Name and/or Identification(ID)
Date of report entry
Equipment type (Vehicle type, container type, etc.)
Shortage:
   Quantity of equipment needed
   Time equipment is needed
   Expected return time of equipment
Surplus:
   Quantity of surplus equipment
   Time equipment is available for others to use
   Time equipment is needed back The input can be repeated for each type of equipment for which a given carrier has a surplus or shortage. The server 10 stores the above information reported by each carrier in the database1 8.

The database 18 stores both static data and dynamic data. Static data include data sets that do not change frequently and accordingly do not require heavy maintenance. Dynamic data are data sets that change more frequently and accordingly require heavier maintenance. The database can be implemented using commercially available database software running on the server 10, such as, for example, the Oracle family of database software available from Oracle Corporation.

Static data stored in the database 18 includes the following types of data: (i) movable assets data, (ii) carrier-related data, (iii) distance data, (iv) equipment equivalence rules, and (v) matching rules. Movable assets data comprises information concerning the attributes of the various types of airport equipment for which the carriers may report shortages or surpluses. Equipment attributes include, for example, industry name, brand, aliases, capacity, geometrical specifications (if applicable), mechanical specification (if applicable), electrical specifications (if applicable), and leasing cost per unit time (which may depend upon the particular lessor-lessee pair). Carrier-related data comprises, for example, carrier name, address, and contact information, as well as the carrier's location at the airport, alliance affiliation, etc. The carrier-related data may also include an identification of undesirable lessees and lessors. Distance data specifies the actual distances between carrier locations within the airport complex and may be considered by the matching engine in determining the most preferable equipment exchanges. Equipment equivalence rules are rules that may be developed by the airport authority to guide the matching process in a situation where an exact match between a reported surplus and a reported shortage cannot be found. For example, an equivalence rule might permit the server 10 to recommend the exchange of a thirty-six passenger bus to satisfy a demand for a twenty-four passenger bus. Another equivalence rule might indicate that one pallet is equivalent to three unit load devices, thus allowing substitutions of such equipment. Matching rules, like equipment equivalence rules, will be developed by the airport authority to guide the matching process in the event that there are more than one possible matches to satisfy a given equipment shortage/surplus situation. The matching engine 20 will employ these rules to specify measures for the "quality" of a match, to rank the candidate lessors, and to break ties. Different airports may have a different set of matching rules. Matching rules are discussed further below.

Dynamic data stored in the database includes: (i) the equipment shortage and surplus information reported by each carrier for each planning horizon, (ii) information used by the lease management engine 24 to track leased equipment including, for example, identification of the lessee and lessor, duration of the lease, fees, insurance, lease status and update information, etc., and (iii) information associated with the matching process, as described more fully below.

The matching engine 20 is responsible for identifying an optimum matching between reported surpluses and shortages over a given planning horizon. For purposes of describing a preferred embodiment of the matching engine, the following terms have the following meanings:

"Exact Equipment Match Condition (EEMC)" means an exact match between a reported shortage of a particular equipment type by one carrier and a reported surplus of that same equipment type by another carrier, without resort to equipment equivalence rules.

"Exact Duration Match Condition (EDMC)" means a match between a reported surplus and a reported shortage, where the available duration for the surplus is greater than or equal to the needed duration for the shortage.

"Distinct Group of Equipment (DGE)" means a group of equipment types related by an equivalence rule and for which the members of the group do not have any equivalence relations with any other groups. That is, one equipment type can replace another if and only if they are members of the same DGE. For example, if equipment type A can replace equipment type B, then both types belong to one DGE. Note that in this case, however, type B need not replace type A equipment.

"Match Value (MV)" means a number assigned by the matching engine 20 to a potential match between a given surplus and shortage pursuant to a particular matching rule (described above).

In the preferred embodiment, the matching engine 20 processes the reported surplus and shortage information in three successive phases. In Phase 1, the matching engine 20 attempts to assign surpluses to shortages satisfying both the EEMC and the EDMC. If all shortages are met, processing stops; otherwise, the remaining unassigned shortages and surpluses are passed to Phase 2.

In Phase 2, the matching engine 20 relaxes the EEMC and then uses the equipment equivalence rules to assign surplus equivalent equipment to shortages satisfying the EDMC. If all shortages are met in this phase, processing stops; otherwise, the remaining unassigned shortages and surpluses will be passed to Phase 3.

In Phase 3, the matching engine 20 provides the following lists to the system administrator, e.g., the airport authority, via the user interface 16:

(i) a list of exact matches from Phase 1;
(ii) a list of matches with equivalent equipment from Phase 2; and
(iii) a list of the remaining shortages and surpluses. In the present embodiment, the administrator can then contact the carriers of the remaining shortages and surpluses to request or suggest that they change any of the duration, type or quantity of their reported shortages in order to achieve complete coverage of these shortages. Preferably, the user interface 16 then provides the administrator with the following options: (i) override the current Phase 1 or Phase 2 matches; (ii) change the attributes of the reported shortages (as provided in response to the request from the administrator) and then rerun Phase 1 and Phase 2; or (iii) accept the system's current recommendations and initiate the leasing process.

It is possible that in either Phase 1, Phase 2, or both there will be more than one matching that satisfies the required conditions. In such cases, the matching engine 20 will use Match Values to determine the most preferred (or optimum) solution. In the presently preferred embodiment, the matching engine 20 will select the set of matches that have the highest total MVs of all other available matches.

The matching engine 20 will compute a total Match Value according to specific requirements of the system administrator, e.g., the airport authority. In the preferred embodiment, the matching engine 20 uses MVs to account for several factors, including without limitation, cost, distance, and the business relationship between the carriers of a given proposed exchange.

With respect to cost, if cheaper leases are preferred, then they will have higher MV values. For example, if a shortage at location A can be satisfied with equipment at location B or equipment at location C. And if location B's lease cost is less than that of location C, then the matching engine 20 will prefer the surplus at location B.

With respect to distance, if proximity of the surplus and shortage locations at the airport is preferred, then matches between locations in close proximity will be assigned higher MV values. For example, if a shortage at location A can be satisfied with equipment at location B or equipment at location C. And if location B is closer to location A than location C, then the Engine will prefer the surplus at location B.

With respect to the business relationship between the potential lessor and lessee, this relationship can also be accounted for using an MV. For example, two carriers that have an established business alliance can be assigned a higher MV than otherwise. Similarly, an MV for carriers who are fierce competitors or for those who do not want to cooperate can be set to zero, hence enforcing a no cooperation rule.

The following is an example report of a recommended exchange between a first carrier and a second carrier:

A message to [carrier#1] from the Airport Authority at [airport]
Pick up [quantity] [equipment type] from [carrier#2] on [date] at [time]
To be returned to [carrier#2] terminal [date] by [time]
[carrier#1] to be billed $ [cost]

Once recommended exchanges of equipment have been determined by the matching engine 20 and reported back to the interested carriers via the user interface 16, the user interface 16 enables the carriers to accept the proposed exchanges and to enter into lessee/lessor transactions for the exchange of the equipment. The lease management engine 24 administers the lease transactions by, for example, enabling the system administrator and the various carriers to track the status of a lease through the user interface 16, and triggering necessary events related to the lease management process, such as fee collection, equipment return notices, overdue notices, insurance claims, and the condition of returned equipment.

The report generator 22 is used to develop canned and customized reports to capture information on leased equipment by type, by time period, by lessee, or by lessor to support the function of managing the equipment exchange service provided by the system of the present invention.

Overall operation of the system 10 is coordinated by a processor 26 as shown. Preferably, the processor 26 is a real-time processor capable of providing up-to-the minute searches for alternate equipment availability with real time notification of progress. This capability is useful, for example, in the event of last minute changes to shortage and surplus conditions caused, for example, by lack of sufficient staff to affect timely return of a leased equipment, or by an unexpected delay in equipment availability status.

Figure 2:
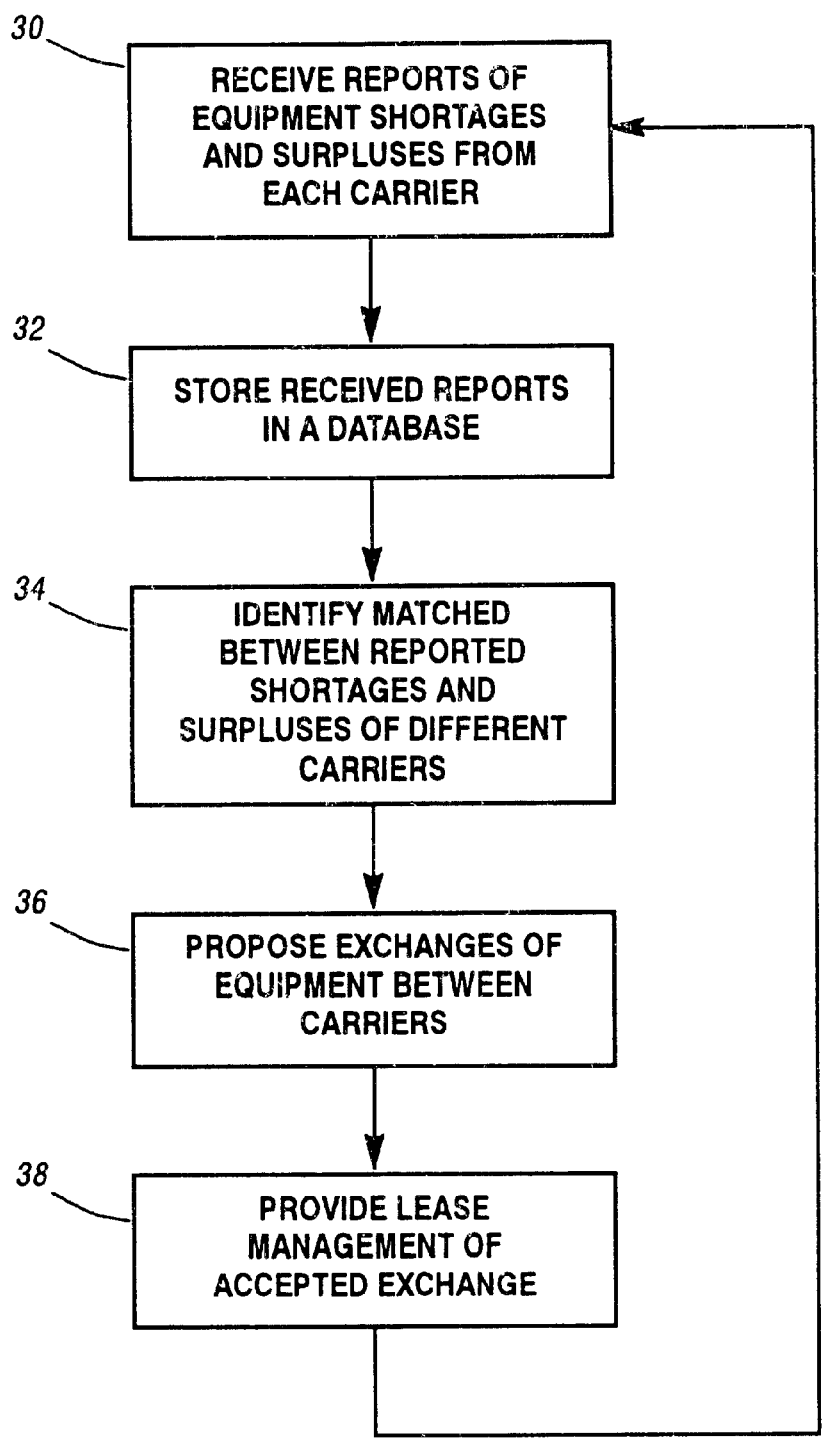
FIG. 2 is a flow diagram illustrating both the operation of the system of FIG. 1 and a preferred embodiment of a method of the present invention.

FIG. 2 is a flow diagram illustrating both the operation of the system of FIG. 1 and a preferred embodiment of a method of the present invention. As shown, at step 30, the system receives reports of equipment shortages and surpluses from each carrier for the next planning horizon. At step 30, the received reports are stored in the database 18. At step 34, matches between reported shortages and surpluses of the different carriers are identified. Preferably, step 34 is performed according to the three phase approach described above. Next, at step 36, exchanges of equipment are proposed to the interested carriers, who may then accept the proposed exchanges. For each pair of carriers that accepts an exchange proposed by the system, the system then provides, in step 38, the lease management services described above. This process is then repeated for the next planning horizon.

The system and method of the present invention, including, for example, the functionality of any or all of the user interface 16, the database 18, the matching engine 20, the lease management engine 24, the report generator 22, and the processor 26 may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. The system and method of the present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level procedural or object-oriented programming language, such as, for example, C, C++, or Java. Alternatively, the program code may be implemented in assembly or machine language. In any case, the language may be a compiled or an interpreted language.

Microsoft and the Microsoft Internet Explorer logo are registered trademarks of Microsoft Corporation. Netscape and Netscape Navigator are registered trademarks of Netscape Communications Corporation. Java is a trademark of Sun Microsystems, Inc. Oracle is a registered trademark of Oracle Corporation.

As the foregoing illustrates, the present invention is directed to a system, method, and computer program product for reducing equipment shortage and surplus conditions among a plurality of carriers at an airport. The present invention can be used to provide an equipment information and exchange service to the carriers at the airport. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method for reducing equipment shortage and surplus conditions among a plurality of carriers at an airport, comprising the steps of:

receiving a report of equipment shortages and surpluses from each carrier;

matching equipment pairs of reported equipment shortages from a first carrier and reported equipment surpluses from a second carrier from the received report of equipment shortages and surpluses;

determining, for each equipment pair, a match value representative of the quality of the equipment pair match;

selecting an equipment pair based on the determined match value; and proposing the selected equipment pair to the first and second carriers for an exchange of equipment between them.

2. The method recited in claim 1, wherein said step of receiving a report of equipment shortages and surpluses from each carrier comprises receiving the following information concerning a shortage of a particular type of equipment: (i) an indication of the equipment type, (ii) an indication of the quantity of the equipment needed, (iii) an indication of a time that the equipment is needed, and (iv) and indication of a length of time the equipment is needed.

3. The method recited in claim 1, wherein said step of receiving a report of equipment shortages and surpluses from each carrier comprises receiving the following information concerning a surplus of a particular type of equipment: (i) an indication of the equipment type, (ii) an indication of the quantity of the surplus equipment, (iii) an indication of a time that the equipment is available for exchange with other carriers, and (iv) and indication of a time that the equipment must be returned.

4. The method recited in claim 1, wherein said proposed exchange of equipment between the first and second carriers comprises a proposed lease of the equipment from the second carrier to the first carrier.

5. The method recited in claim 4, further comprising the steps of:

receiving approval of the proposed lease of equipment from the first and second carriers; and providing lease management services to the first and second carriers to facilitate the exchange of equipment between them.

6. The method recited in claim 5, further comprising the step of charging the first and second carriers a fee based on the lease transaction.

7. The method recited in claim 1, further comprising requesting payment from each of the carriers for performing said receiving, matching, and proposing steps for them.

8. The method recited in claim 1, wherein the step of matching comprises:

matching, based on a first level criterion, the reported equipment shortage from the first carrier with the reported equipment surplus of the second carrier, the first level criterion comprising an exact equipment match and a time duration match wherein a surplus duration is greater than or equal to a shortage duration.

9. The method recited in claim 8, wherein the step of matching comprises:

matching, based on a second level criterion, the reported equipment shortage from the first carrier with the reported equipment surplus of the second carrier, the second level criterion comprising matching based upon an equipment rule.

10. The method recited in claim 1, wherein the step of determining a match value comprises:

determining the match value based upon a predefined cost associated with an equipment match.

11. The method recited in claim 1, wherein the step of determining a match value comprises:

determining the match value based upon a predefined distance associated with an equipment match.

12. The method recited in claim 1, wherein the step of determining a match value comprises:

determining the match value based upon a predefined business relationship value associated with an equipment match.

* * * * *